3,580,913
PROCESS FOR PREPARING SUBSTITUTED-6-
TRIFLUOROMETHYLURACILS
Albert William Lutz, Princeton, N.J., assignor to American Cyanamid Company, Stamford, Conn.
No Drawing. Filed June 17, 1968, Ser. No. 737,288
Int. Cl. C07d 51/30, 51/32
U.S. Cl. 260—260                                    7 Claims

ABSTRACT OF THE DISCLOSURE

Herbicidal uracils are prepared in accordance with the following equation:

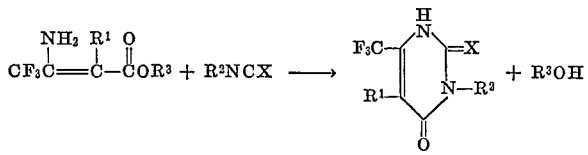

The single step reaction is carried out in the presence of a solvent and an alkali metal hydride or alkali metal alkoxide.

In the above equation:

$R^1$ is hydrogen or lower alkyl,
$R^2$ is alkyl, alkenyl, cycloalkyl, phenyl, benzyl, or specific mono and disubstituted derivatives thereof,
$R^3$ is lower alkyl, and
X is oxygen or sulfur.

SUMMARY OF THE INVENTION

This invention relates to a novel single step method for preparing herbicidal substituted 6-trifluoromethyluracils and thiouracils of the formula:

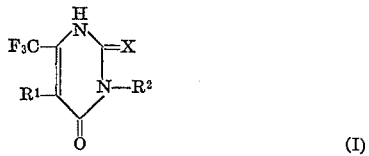

where $R^1$ is hydrogen or lower alkyl, and
$R^2$ is alkyl, alkenyl, cycloalkyl, phenyl, benzyl, and substituted derivatives of these radicals.

More particularly, this invention relates to a method of preparing Formula I compounds which comprises contacting an ester of a β-amino-α,β-unsaturated acid having the formula:

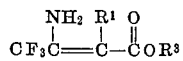

and an isocyanate of the formula, $R^2NCX$, in the presence of a solvent and an alkali metal hydride or alkali metal lower alkoxide, where $R^3$ is lower alkyl, X is oxygen or sulfur, and $R^1$ and $R^2$ are as previously defined.

The various R groupings referred to hereinabove in relation to the Formula I compounds may be further amplified as follows:

The term "lower alkyl" means straight and branched chain alkyl radicals containing from 1 to 4 carbon atoms; illustrative members are methyl, ethyl, n-propyl, isopropyl, n-butyl, isobutyl, secondary butyl, and tertiary butyl.

The term "alkyl" means straight and branched chain alkyl radicals containing from 1 to 12 carbon atoms; illustrative members include "lower alkyls" as defined above plus other members such as pentyl, hexyl, heptyl, octyl, nonyl, decyl, undecyl, dodecyl, 2-methylhexyl, 3,3-dimethylpentyl, and triisopropylmethyl.

The term "cycloalkyl" means saturated cyclic structures containing from 3 to 8 carbon atoms; illustrative members are cyclopropyl, cyclobutyl, cyclopentyl, cyclohexyl, cycloheptyl, and cyclooctyl.

The term "alkenyl" means unsaturated straight and branched hydrocarbon chains containing from 2 to 6 carbon atoms; illustrative members are allyl, 2-butenyl, and 2-methylallyl.

The terms "substituted lower alkyl," "substituted alkyl," "substituted cycloalkyl," "substituted alkenyl," "substituted phenyl," and "substituted benzyl" mean that the basic radical may contain up to two substituents selected from the group consisting of halo, nitro, amino, lower alkyl, monohalo(lower)alkyl, polyhalo(lower)alkyl, alkoxy, carboxy, and carbalkoxy; illustrative members include 2-methoxyethyl, 3-methoxypropyl, 2-bromopropyl, 4-chlorobutyl, 2 nitrophenyl, 2-carbomethoxypropyl, 3-bromo-2-methoxypropyl, tolyl, 3,4-dichlorophenyl, p-aminophenyl, m-trifluoromethylphenyl, p-carboxyphenyl, 2,4-dichlorophenyl, and the like. When two substituents are present, they may be identical or dissimilar.

The term "halo" means chloro, bromo, iodo, and fluoro.

The term "alkoxy" means alkoxy radicals containing from 1 to 4 carbon atoms; illustrative members are methoxy, ethoxy, propoxy, and butoxy.

The term "carbalkoxy" is limited to the alkoxides as defined above; illustrative members are carbomethoxy, carboethoxy, carbopropoxy, and carbobutoxy.

THE PRIOR ART

This invention has as an object the provision of a variety of substituted 6-trifluoromethyluracils and thiouracils containing organic substituents on the number 3 ring nitrogen, these substituents being attached to the ring by a carbon-nitrogen bond. It is known that direct organic substitution of this ring position in a selective manner is generally unavailing since substitution will simultaneously occur at other available ring positions resulting in an undersirable product mixture. The preferred method of selectively substituting a uracil ring with an organic group is to cyclize straight chain compounds having the desired organic substituent positioned on the proper carbon or nitrogen prior to cyclization.

6-trifluoromethyluracils and thiouracils containing organic substitution on the number 3 nitrogen have not been previously reported. However, 6-trifluoromethyluracil and 6-trifluoromethyl-2-thiouracil have been prepared by condensing ethyl trifluoroacetoacetate and urea or thiourea, respectively, in the presence of a solvent and base as shown in J. Org. Chem. 24, 113 (1959) and J.A.C.S. 70, 500 (1948), respectively. It is further known that organic substituted ureas and thioureas will react with compounds such as ethylacetoacetate to produce 6-methyluracils and 6-methyl-2-thiouracils. Accordingly, it might be expected that organic substituted ureas might be similarly reacted with ethyl trifluoroacetoacetate to produce Formula I compounds. However the reaction unexpectedly failed to proceed to any appreciable extent with the trifluoroacetoacetate compounds.

U.S. Pat. 3,235,357 presents a process for preparing 6-alkyl uracils containing organic substitution on the number 3 nitrogen. The two step process is illustrated in the following equations:

(1)

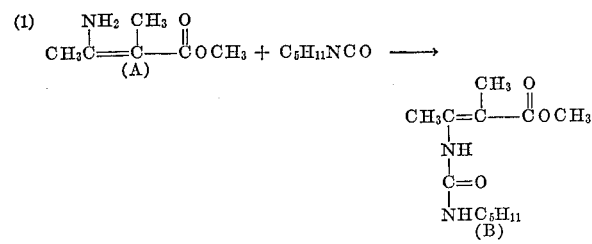

(2)

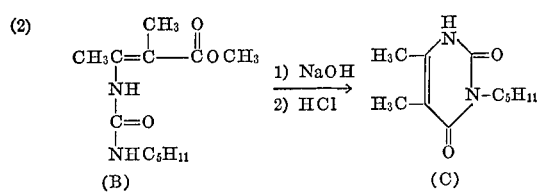

Step (1) occurs in a solvent such as benzene or toluene, followed by filtration to remove solids, and evaporation which separates the solvent from the filtrate to leave impure compound (B). Compound (B) is then treated with aqueous alkali and acid to produce compound (C).

It would appear that this process should readily be adaptable to preparing identical 6-trifluoromethyluracils by merely replacing the methyl group on the carbon bearing the amino group in compound (A) with a trifluoromethyl group. However, when this approach was tried, reaction step (1) surprisingly failed to proceed to any appreciable extent thereby indicating that the reference process, which does not utilize base in the first step, is limited to the preparation of organic substituted 6-alkyl uracils.

It becomes apparent that the simultaneous occurrence of organic substituents on the number three nitrogen and the presence of a trifluoromethyl grouping in the Formula I compounds is a barrier to their preparation by related prior art processes. These barriers are conveniently overcome by practicing the single step process of this invention.

DETAILED DESCRIPTION OF THE INVENTION

The inventive process proceeds according to the following equation:

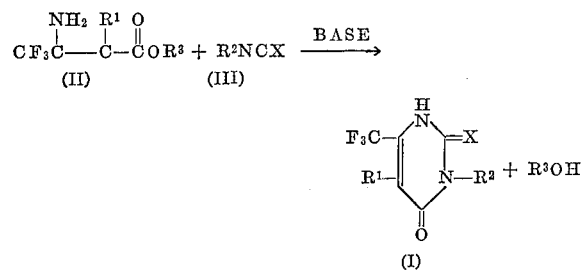

where X and the R terms are as previously defined. Reactant isocyanate (III) is readily prepared by a variety of hitherto known methods. The reactant ester of β-amino-α,β-unsaturated acid (II) is likewise conveniently prepared by known techniques such as that of Jouillé described in J. Org. Chim. 21, 1358 (1956). Reactant (II) as well as product (I) may exist in tautomeric forms as shown below:

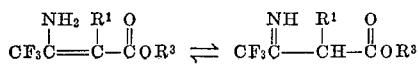

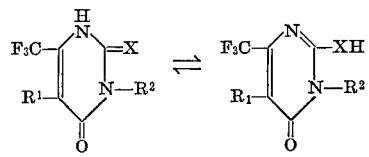

Such tautomeric forms are included within the scope of the invention.

It is an important aspect of the invention that the reaction be carried out in the presence of an inert solvent and a solvent-soluble highly alkaline base in order to insure that the reaction proceeds satisfactorily.

Among the solvents which are suitable are aromatic solvents containing from 6 to 8 carbon atoms such as toluene (benzene, xylene; lower alkanols containing from 1 to 8 carbon atoms such as methanol, ethonal, isopropanol, butanol, pentanol, octanol, t-butanol; low molecular weight (i.e. a molecular weight not exceeding about 200) glycol ethers such as diethylene glycol dimethyl ether (diglyme), ethylene glycol dimethyl ether (glyme), diethylene glycol diethyl ether, and ethylene glycol diethyl ether; and diplor aprotic solvents, i.e. solvents which are substantially chemically inert toward reactants (II) and (III) as well as product (I), which has a coordinated valence link between two originally neutral atoms whereby one loses and the other gains a share of two electrons, and which neither yields a proton to the solute, nor gains one from it. Illustrative dipolar aprotic solvents are dimethylsulfoxide (a highly preferred solvent), dimethylformamide, acetone, methyl isobutyl ketone, acetonitrile, nitrobenzene, N,N-dimethylacetamide, and the tetrahydrosulfolanes such as tetrahydrothiophene dioxide.

Suitable bases are potassium tertiary butoxide (the preferred base), sodium methoxide, sodium propoxide, sodium hydride, potassium hydride, and lithium hydride. A preferred amount of base is about 0.9 to about 1.1 moles per mole of reactant.

A highly preferred solvent-base system is that of dimethylsulfoxide and potassium tertiary butoxide because of the increased product yields observed therewith. The solvent-base system, however, is not limited to a single solvent and base and may include combinations such as a single base with more than one solvent, a single solvent with more than one base, or simultaneously more than one solvent and more than one base.

The process appears insensitive to pressure and may be carried out at atmospheric, sub-atmospheric or super-atmospheric pressures. Temperatures between about 15° C. and about 100° C. are suitable. Preferred conditions are atmospheric pressure and a temperature range of about 25° C. to about 50° C.

The products (I) prepared by this process may be readily converted into their corresponding acid or base salts by reaction with the appropriate acid or base employing known methods.

UTILITY

The 6-trifluoromethyluracils and thiouracils produced by the inventive process are useful pre- and post-emergence herbicides as exemplified by the data shown in Examples 15 and 16. The compounds are further characterized by their selective herbicidal activity in both pre- and post-emergence application. While the compounds are most effective in controlling broad and narrow leaf vegetation generally, their effect on useful crops such as corn, cotton, snap-beans, soybeans, and the like is minimal. This selective herbicidal behavior makes them particularly effective in controlling vegetation growing among useful or economic crops.

Compounds prepared by the inventive process may be further modified, especially when $R^1$ is hydrogen, to produce compounds with various substituents in the number 5 ring position. When the substituent is halo, nitro, cyano, thiocyano, alkoxy, or the like, the compounds also have herbicidal activity similar to that mentioned above. The substituents may be introduced directly into the uracil ring by methods hitherto known such as that exemplified in Example 14.

The compounds prepared by the process of this invention may be applied for purposes of weed control by employing both conventional type formulations and equipment. The compounds may, for example, be formulated as wettable powders, dusts, dust concentrates, emulsifiable concentrates and the like which are amenable to application with conventional spraying or dusting apparatus.

Wettable powder formulations are generally prepared by admixing from about 25% to about 95%, by weight, of active ingredient with finely ground clay, such as kaolin or attapulgite, either with or without a surface active agent, emulsifier or spreader-sticker. The latter is then dispersed in water for spray application.

Dusts and dust concentrates are similarly prepared using from about 5% to about 95% of active ingredient and from about 95% to about 5% of finely divided inert ingredients. These dusts are generally applied as such, or they may be further diluted with finely ground inert solids and then applied with conventional dusting apparatus.

Emulsifiable concentrates may be prepared by dissolving or dispersing the active ingredient in organic solvent, with or without emulsifying agents, surfactants or the like. Such formulations are then diluted with either water or an appropriate organic diluent prior to application.

The following examples are provided to further illustrate the invention.

EXAMPLE 1

Preparation of 3-isopropyl-6-trifluoromethyluracil in dimethylsulfoxide

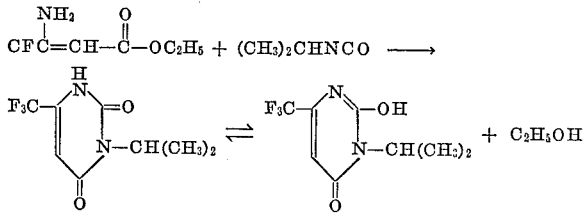

A solution of ethyl 3-amino - 4,4,4 - trifluorocrotonate (10.7 g., .058 mole) in 20 ml. of anhydrous dimethyl sulfoxide was added in portions with stirring to a solution of potassium tert-butoxide (6.55 g., .058 mole) in 50 ml. dimethyl sulfoxide. Cooling was required to maintain the temperature at 25° C.

Isopropyl isocyanate (5.48 g., .064 mole) was added all at once with vigorous stirring to the above solution. After one hour the yellow solution was poured into a large volume of water and this solution extracted three times with ether. The ether layers were discarded.

The aqueous phase was acidified to a pH of 1 with hydrochloric acid and then extracted three times with ether. After washing the ether with water, drying and stripping in vacuo, a pale yellow solid residue of 11.3 g. (87.0%) remained. The product was recrystallized from water to give the analytical sample which has a melting point of 139–142° C. $C_8H_9F_3N_2O_2$ requires (percent): C, 43.35; H, 4.08; F, 25.65; N, 12.61. Found (percent): C, 43.24; H, 3.93; F, 25.45; N, 12.72.

EXAMPLE 2

Preparation of 3-isopropyl-6-trifluoromethyluracil in toluene

Following substantially the same procedure as in Example 1 except replacing dimethylsulfoxide by toluene, the product was isolated in 47% yield, melting point: 138–142° C.

EXAMPLES 3–11

Following substantially the same procedure as in Example 1 except varying the isocyanate employed, a variety of compounds were prepared as shown in the following tabulation.

| Ex. No. | Isocyanate | X | R¹ | R² | Melting point (° C.) |
|---|---|---|---|---|---|
| 3 | Methyl isocyanate | O | H | $CH_3$ | 237–238.5 |
| 4 | n-Octyl isocyanate | O | H | $n\text{-}C_8H_{17}$ | 130–133.3 |
| 5 | n-Dodecyl isocyanate | O | H | $n\text{-}C_{12}H_{25}$ | 121–125 |
| 6 | Cyclohexyl isocyanate | O | H | cyclohexyl | 195–197 |
| 7 | Phenyl isocyanate | O | H | phenyl | 235–236 |
| 8 | 3,4-dichlorophenyl isocyanate | O | H | 3,4-dichlorophenyl | 238–239 |
| 9 | Carbethoxymethyl isocyanate | O | H | $CH_2COOC_2H_5$ | 149–150.5 |
| 10 | Allyl isocyanate | O | H | $CH_2CH=CH_2$ | 158–160 |
| 11 | Isopropyl isothiocyanate | S | H | $CH(CH_3)_2$ | 178–179 |

The above listed compounds and other compounds represented by Formula I may be prepared in a manner substantially the same as that shown in Example 1 except that different solvents and alkaline bases such as those already exemplified hereinabove may be used.

EXAMPLE 12

Preparation of 3-n-octyl-5-n-propyl-6-trifluoromethyl-2-thiouracil

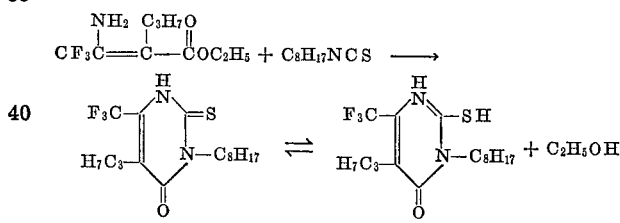

A solution of ethyl 3-amino-2-n-propyl-4,4,4-trifluorocrotonate (11.3 g., 0.05 mole) in 20 ml. of anhydrous dimethylsulfoxide is added in portions with stirirng to a solution of potassium tert-butoxide (5.61 g., 0.05 mole) in 50 ml. dimethylsulfoxide. The temperature is held at 25–30° C. n-Octyl isothiocyanate (8.54 g., 0.055 mole) is added all at once with vigorous stirring to the above solution. After one hour the solution is worked up as described in Example 1 to give the desired product.

EXAMPLE 13

Preparation of 3-cyclohexyl-5-methyl-6-trifluoromethyl-2-thiouracil

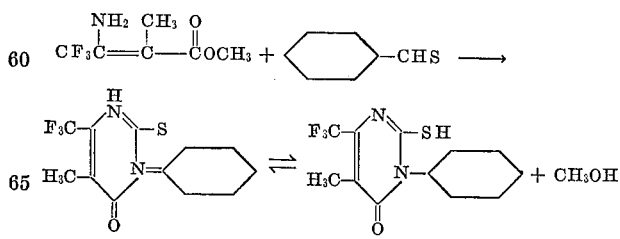

A solution of methyl 3-amino-2-methyl-4,4,4-trifluorocrotonate (9.16 g., 0.05 mole) in 20 ml. of anhydrous dimethyl sulfoxide was added in portions with stirring to a solution of potassium tert-butoxide (5.61 g., 0.05 mole) in 50 ml. dimethylsulfoxide. The temperature was maintained at 25–30° C. Cyclohexyl isothiocyanate (7.75 g., 0.055 mole) was added all at once with vigorous stirring to the above solution. After one hour the yellow solution

EXAMPLE 14

Preparation of 3-isopropyl-5-bromo-6-trifluoromethyluracil

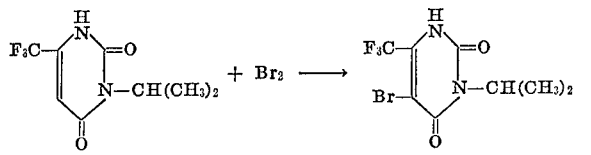

3-isopropyl-6-trifluoromethyluracil (7.4 g., .0334 mole) was dissolved in a mixture of 0.5 N NaOH (.04 mole) and chloroform (15 ml.) solution of bromine (5.89 g., .0367 mole) in 25 ml. chloroform was added in portions with stirring. After the addition was complete, the reaction mixture was stirred for one-half hour before discharging the bromine color with sodium bisulfite. The layers were separated and the aqueous layer extracted with fresh chloroform. The combined chloroform extracts were washed with water and then evaporated to dryness leaving 10.1 g. (100%) of white solid residue. One recrystallization from benzene gave a product with a melting point of 146–150° C. The analytical sample melting point was 151–154.5° C. Structure was conformed by infra-red spectroscopy. $C_8H_8BrF_3N_2O_2$ requires (percent): C, 31.92; H, 2.67; Br, 26.54; F, 18.93; N, 9.30. Found (percent): C, 31.19; H, 2.64; Br, 25.59; F, 18.72; N, 9.08.

HERBITOXICITY INDEX

9=100% reduction in stand
9— =1 or 2 stunted plants remaining
8=85—<100% reduction in stand
7=70—<85% reduction in stand
6=60—<70% reduction in stand
5=50—<60% reduction in stand
4=40—<50% reduction in stand
3=30—<40% reduction in stand
2=20—<30% reduction in stand
1=10—<20% reduction in stand
0=no apparent effect
—=no test
t=trace to slight injury
g=unusual physiological effect
m=moderate injury
c=chlorotic Abbreviations for the plant species employed in the herbicidal activity tests of Examples 15 and 16 are as follows:

Rag=Ragweed
Ko=Kochia
La=Lambsquarters
Mu=Mustard
Pi=Pigweed
Ba=Barnyard grass
Cr=Crabgrass
GF=Green Foxtail
Wo=Wild Oats

TABLE 1.—PRE-EMERGENCE HERBICIDAL DATA

| Compound as prepared in Example | Lb./acre | Rag | Ko | La | Mu | Pi | Ba | Cr | GF | Wo |
|---|---|---|---|---|---|---|---|---|---|---|
| 1 | 4 | 9 | 9 | 9 | 9 | 9 | 9 | 9 | 9 | 9 |
| 3 | 4 | 3 | — | 9— | 9— | 9 | 9— | 9— | mg | 9c |
| 4 | 4 | — | 0 | 5g | 9—c | 3g | mg | mg | 3g | 8 |
| 5 | 4 | 0 | — | 3 | 3 | 0 | 3g | mg | mg | m |
| 6 | 4 | — | 9— | 9— | 9 | 7g | 7g | 4g | tg | 0 |
| 7 | 4 | 9 | — | 9 | 9 | 9 | 3g | 8g | mg | mg |
| 8 | 4 | 9 | — | 9 | 9 | 9— | 3g | 9 | 8g | 0 |
| 9 | 4 | — | tg | 5 | 9— | 0 | 5 | 9 | 9 | 0 |
| 10 | 4 | — | 9 | 9 | 9 | 9 | 7g | 9 | 9 | 9 |
| 11 | 4 | — | 8g | 9— | 9 | 9 | 7 | 9 | 9 | 9 |
| 14 | 4 | — | 9 | 9 | 9 | 9 | 9 | 9 | 9— | 8 |

EXAMPLE 15

Pre-emergence herbicidal activity of 3-substituted-6-trifluoromethyluracils

The pre-emergence herbicidal activity of compounds produced by the present invention is exemplified by the following tests in which the seeds of a variety of monocotyledonous and dicotyledonous plants are separately mixed with potting soil and planted on top of approximately one inch of potting soil in separate pint cups. After planting, the cups are sprayed with the selected aqueous-acetone solution containing the test compound in sufficient quantity to provide the equivalent of the desired pounds per acre of test compound per cup. The treated cups are then placed on greenhouse benches and cared for in the usual manner, in accordance with greenhouse procedures. Two weeks after treatment, the tests are terminated and each cup is examined and rated according to the defined Herbitoxicity Index given in the table below. The tabulated results of these tests presented in Table 1 establish the herbicidal proficiency of the test compounds.

EXAMPLE 16

Post-emergence herbicidal activity of 3-substituted-6-trifluoromethyluracils

The post-emergence herbicidal activity of compounds produced by the present invention is demonstrated by treating a variety of monocotyledonous and dicotyledonous plants with the compounds dispersed in aqueous-acetone mixtures. In the test seedling plants are grown in "Jiffy" flats for about two weeks. The test compounds are dispersed in 50/50 acetone/water mixtures in sufficient quantity to produce the desired concentrations in pounds per acre of active compound when applied to the plants through a spray nozzle operating at 30 p.s.i. for a predetermined time. After spraying, the plants are placed on greenhouse benches and are cared for in the usual manner, commensurate with conventional greenhouse practices. Two weeks after treatment, the seedling plants are examined and rated in Table 2 below according to the Herbitoxicity Index provided in Example 15.

TABLE 2.—POST-EMERGENCE HERBICIDAL DATA

| Compound as prepared in Example | Lb./acre | Rag | Ko | La | Mu | Pi | Ba | Cr | GF | Wo |
|---|---|---|---|---|---|---|---|---|---|---|
| 1 | 4 | — | 9 | 9 | 9 | 9 | 9 | 9 | 9 | 9 |
| 3 | 4 | — | 9 | 9 | 9 | 9 | 9 | 9 | 9 | 9 |
| 4 | 4 | — | 9 | mg | mg | mg | t | t | t | 0 |
| 6 | 4 | — | 9 | 9 | 9 | 9 | 7 | 8 | 9 | t |
| 7 | 4 | — | 9 | 9 | 9 | 9 | 9 | 9 | 9 | 9 |
| 8 | 4 | — | 9 | 9 | 9 | m | 9— | 8 | 9 | 3 |
| 9 | 4 | 9 | — | s | 9 | m | 8 | s | 9 | 0 |
| 10 | 4 | — | 9 | 9 | 9 | 9 | 9 | 9 | 9 | 9 |
| 11 | 4 | 9 | — | 9 | 9 | 9 | 9— | 9— | 9 | 9— |
| 14 | 4 | — | 9 | 9 | 9 | 9 | 9 | 9— | 9 | 9 |

I claim:
1. A process for preparing 6-trifluoromethyluracils and thiouracils, and tautomers thereof, of the formula:

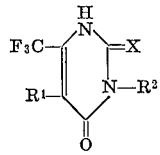

which comprises bringing into reactive contact an ester of β-amino-α,β-unsaturated acid, and tautomers thereof, of the formula:

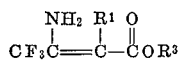

and an isocyanate of the formula, $R^2NCX$, in the presence of at least one solvent and at least one base selected from the group consisting of alkali metal hydrides and alkali metal lower alkoxides, wherein $R^1$ is hydrogen or lower alkyl having from 1 to 4 carbon atoms, $R^2$ is selected from the group consisting of alkyl having from 1 to 12 carbon atoms, alkenyl having from 2 to 6 carbon atoms, cycloalkyl having from 3 to 8 carbon atoms, phenyl, benzyl, substituted alkyl, substituted alkenyl, substituted cycloalkyl, substituted phenyl, and substituted benzyl wherein the substituents are selected from the group consisting of halo, nitro, amino, lower alkyl from 1 to 4 carbon atoms, monohalo(lower)alkyl, polyhalo(lower)alkyl, alkoxy from 1 to 4 carbon atoms, and carbalkoxy having from 1 to 4 carbon atoms, $R^3$ is lower alkyl having from 1 to 4 carbon atoms, and X is selected from the group consisting of oxygen and sulfur.

2. The process of claim 1 wherein the solvent is selected from the group consisting of aromatic solvents ($C_6$–$C_8$), lower alkanols ($C_1$–$C_4$), glycol ethers having a molecular weight not in excess of 200, and dipolar aprotic solvents.

3. The process of claim 2 where X is oxygen, $R^1$ is hydrogen, and $R^2$ is alkyl containing from two to five carbon atoms.

4. The process of claim 3 wherein the solvent is selected from the group consisting of dimethylsulfoxide, dimethylformamide, acetone, methyl isobutyl ketone, acetonitrile, benzene, toluene, xylene, lower alkanols ($C_1$–$C_4$), diethylene glycol dimethyl ether, and ethylene glycol dimethyl ether.

5. The process of claim 4 where the base is selected from the group consisting of sodium hydride and potassium tertiary butoxide.

6. The process of claim 5 where the solvent is dimethylsulfoxide and the base is potassium tertiary butoxide.

7. The process of claim 6 wherein the reaction temperature is about 15° C. to about 100° C.

References Cited
UNITED STATES PATENTS

| | | | |
|---|---|---|---|
| 3,137,698 | 6/1964 | Pfister | 260—260 |
| 3,235,357 | 2/1966 | Loux | 260—260 |

ALEX MAZEL, Primary Examiner

A. M. T. TIGHE, Assistant Examiner

U.S. Cl. X.R.

260—251R, 256.1C, 256.5R, 482R; 71—92